United States Patent
Fan et al.

(10) Patent No.: US 11,011,166 B2
(45) Date of Patent: May 18, 2021

(54) VOICE MESSAGE CATEGORIZATION AND TAGGING

(71) Applicant: INTERNATIONAL BUSINESS MACHINES CORPORATION, Armonk, NY (US)

(72) Inventors: Si Bin Fan, Beijing (CN); Yu Gu, Austin, TX (US); Su Liu, Austin, TX (US); Yun Xiang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

(21) Appl. No.: 16/204,530

(22) Filed: Nov. 29, 2018

(65) Prior Publication Data

US 2020/0175972 A1    Jun. 4, 2020

(51) Int. Cl.

| | |
|---|---|
| *G10L 15/22* | (2006.01) |
| *G10L 15/18* | (2013.01) |
| *G10L 15/30* | (2013.01) |
| *G10L 25/63* | (2013.01) |
| *G06F 3/0481* | (2013.01) |
| *H04M 1/72433* | (2021.01) |
| *G10L 15/08* | (2006.01) |

(52) U.S. Cl.
CPC .......... *G10L 15/22* (2013.01); *G06F 3/04817* (2013.01); *G10L 15/1815* (2013.01); *G10L 15/30* (2013.01); *G10L 25/63* (2013.01); *H04M 1/72433* (2021.01); *G10L 2015/088* (2013.01)

(58) Field of Classification Search
None
See application file for complete search history.

(56) References Cited

U.S. PATENT DOCUMENTS

| | | | |
|---|---|---|---|
| 6,449,342 B1 | 9/2002 | Johanson | |
| 8,280,015 B2 | 10/2012 | Milstein et al. | |
| 8,498,624 B2 | 7/2013 | Nadarajah et al. | |
| 8,671,149 B1 | 5/2014 | Baxter, Jr. | |
| 8,825,478 B2* | 9/2014 | Cox | H04L 12/1822 |
| | | | 704/208 |
| 9,848,082 B1* | 12/2017 | Lillard | H04M 3/5231 |

(Continued)

FOREIGN PATENT DOCUMENTS

WO    2016209824 A1    12/2016

OTHER PUBLICATIONS

Mell et al., "The NIST Definition of Cloud Computing", NIST, Special Publication 800-145, Sep. 2011, 7 pages.

(Continued)

*Primary Examiner* — Douglas Godbold
(74) *Attorney, Agent, or Firm* — Noah Sharkan; Andrew D. Wright; Roberts Calderon Safran & Cole, P.C.

(57) ABSTRACT

In embodiments, a method includes: defining a plurality of visual icons; receiving a voice message, metadata and voice tagging criteria from a first client device; converting the voice message to text; generating a summary of the converted text; generating keywords based on the summary; categorizing the voice message into categories based on the keywords and the metadata; selecting visual icons based on the categories and the tagging criteria; tagging the voice message with the selected visual icons; and sending the tagged voice message to a second client device.

20 Claims, 9 Drawing Sheets

(56) References Cited

U.S. PATENT DOCUMENTS

| | | | |
|---|---|---|---|
| 2003/0050778 A1* | 3/2003 | Nguyen | G10L 15/30 704/235 |
| 2007/0129059 A1 | 6/2007 | Nadarajah et al. | |
| 2008/0075244 A1* | 3/2008 | Hale | H04M 3/53333 379/88.13 |
| 2008/0260117 A1 | 10/2008 | Jackson | |
| 2011/0013756 A1* | 1/2011 | Davies | G10L 15/22 379/88.14 |
| 2011/0021178 A1* | 1/2011 | Balasaygun | G10L 25/48 455/413 |
| 2012/0330658 A1* | 12/2012 | Bonforte | H04M 1/72552 704/235 |
| 2013/0325467 A1 | 12/2013 | Hale et al. | |
| 2014/0324414 A1* | 10/2014 | Zhang | G06F 40/279 704/9 |
| 2018/0160200 A1* | 6/2018 | Goel | G06F 40/289 |
| 2018/0218734 A1* | 8/2018 | Somech | G10L 15/005 |
| 2020/0126584 A1* | 4/2020 | Huang | G10L 15/1815 |

OTHER PUBLICATIONS

Google Voice, https://voice.google.com/u/0/signup#inbox, accessed Nov. 20, 2018, 1 page.

* cited by examiner

VOICE MESSAGE CATEGORIZATION AND TAGGING

BACKGROUND

The present invention relates generally to categorizing and tagging voice messages and, more particularly, to attaching a visual display such as an emoji describing the content of a voice message.

Social media applications on mobile devices are currently widely used, and over a billion people worldwide use some form of media-supported chatting. A large number of people rely on media-supported group chatting methods to send texts and voice messages, and any given person may receive a large number of voice messages, particularly within the context of a group chat.

SUMMARY

In an aspect of the invention, there is a computer-implemented method that includes: defining, by a server, a plurality of visual icons; receiving, by the server and from a first client device, a voice message, metadata of the voice message, and tagging criteria; converting, by the server, the voice message to text; generating, by the server, a summary of the converted text; generating, by the server, keywords based on the summary; categorizing, by the server, the voice message into one or more categories based on the keywords and the metadata; selecting, by the server, at least one of the plurality of visual icons based on the categories and the tagging criteria; tagging, by the server, the voice message with the selected at least one of the plurality of visual icons; and sending, by the server and to a second client device, the tagged voice message.

In another aspect of the invention, there is a computer program product comprising a computer readable storage medium having program instructions embodied therewith, the program instructions being executable by a computer device to cause the computer device to: establish a user profile, a service profile, and tagging criteria at a client device; determine metadata for a voice message; embed the metadata in the voice message; apply the voice tagging criteria to the voice message; and send the voice message, the metadata and the voice tagging criteria to a server.

In another aspect of the invention, there is a system comprising: a processor, a computer readable memory, and a computer readable storage medium; program instructions to define a plurality of visual icons; program instructions to receive, from a first client device, a voice message, metadata of the voice message, and tagging criteria; program instructions to convert the voice message to text; program instructions to generate a summary of the converted text; program instructions to generate keywords based on the summary; program instructions to categorize the voice message into one or more categories based on the keywords and the metadata; program instructions to select at least one of the plurality of visual icons based on the categories and the tagging criteria; program instructions to tag the voice message with the selected at least one of the plurality of visual icons; and program instructions to send the tagged voice message to a second client device. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
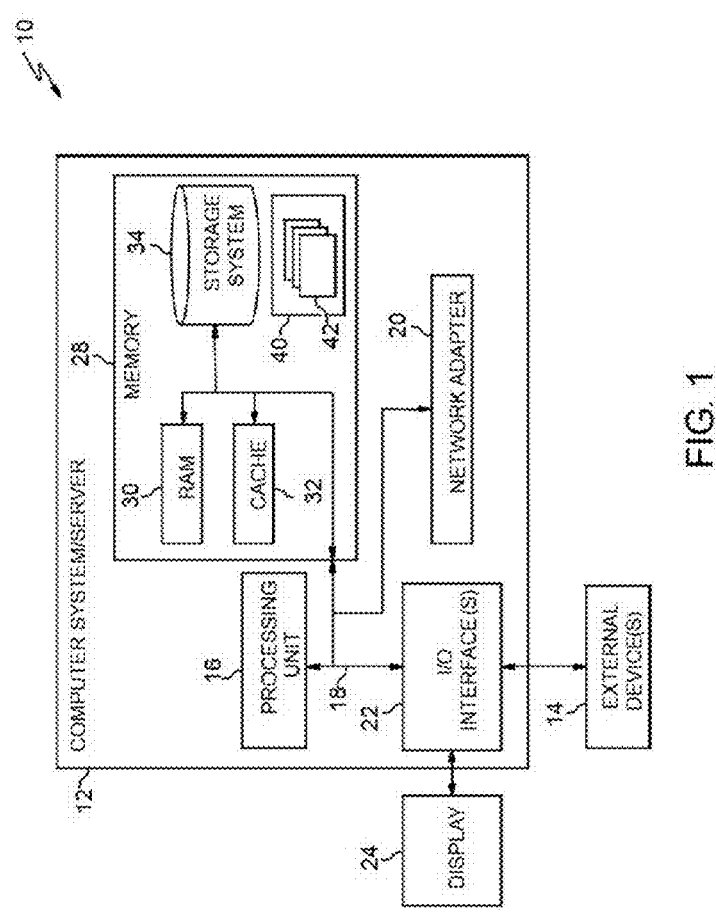
FIG. 1 depicts a cloud computing node according to an embodiment of the present invention.

The present invention relates generally to categorizing and tagging voice messages and, more particularly, to attaching a visual display such as an emoji describing the content of a voice message. In embodiments, the method displays, on the screen of the receiving device, an illustration of the voice message, which allows a person viewing the illustration to obtain an understanding of the contents of the voice message without having to listen to the voice message. In embodiments, a sending device that sends the voice message determines whether to tag the voice message, and sends the voice message to the receiving device via a server. In embodiments, the server tags the voice message by applying a visual tag such as an emoji to the voice message, and sends the tagged voice message to the receiving device for being displayed on the receiving device. For example, embodiments relate to a server translating a voice message received from the sending device to text, summarizing the text, extracting keywords from the summary, selecting symbols or tags that are illustrative of the meaning of the keywords, and tagging or affixing the symbols or tags on the display screen of the receiving device. Accordingly, a person receiving the voice message can access a visual illustration of the contents of the voice message on the screen of the receiving device without having to listen to the voice message, which saves time and effort in reviewing a large number of voice messages. In embodiments, the sending and receiving devices are portable devices such as a smart phones, tablets, portable computers, and the like.

Embodiments relate to categorizing and tagging voice messages and, more particularly, to attaching a visual display, such as an emoji or other meaningful symbol, to a voice message display, the emoji illustrating the contents of the voice message. According to aspects of the invention, there is a method including defining a number of visual symbols that are illustrative of a range of parameters such as, for example, situations, emotions, locations, or other parameters. These visual symbols are pre-stored in a memory and selected based on the contents of the voice message. The method includes receiving a voice message, converting the voice message to text, summarizing the converted text, generating keywords based on the summary, categorizing the voice message into one or more categories based on the keywords, selecting one or more visual symbols from the pre-defined visual symbols, and displaying the selected visual symbols next to the received voice message on the screen of the portable device. Accordingly, a person can view the visual symbol(s) on the screen of the portable device and obtain an idea of the contents of the corresponding voice message(s) based on the visual symbol(s).

Embodiments relate to a method and service for defining a real time voice message meaningful symbolic (e.g., emoji) tagging method for extracting, tagging, affixing, and displaying keywords in a received voice message on a chatting application. In this manner, implementations of the invention provide a method comprising: intercepting and embedding a voice message accordingly to context, user configuration, and user voice input settings; sending and receiving a voice message with metadata (context, emotional, preference information); supporting features of enable/disable voice meaningful symbolic (e.g., emoji) tags; receiving and affixing the generated keywords to the voice message; and providing a graphical user interface (GUI) for filtering and displaying the voice message with the affixed keyword meaningful symbolic (e.g., emoji) tags.

In embodiments, a service request interaction and back-end module are configured to perform functions including: defining voice message meaningful symbolic (e.g., emoji) tagging and management criteria; converting the voice message into a full text, and subsequently summarizing the full text as needed; generating keywords according to the contents and the summary; categorizing the voice message according to the keywords; and creating voice meaningful symbolic (e.g., emoji) tags for the categorized messages.

Embodiments of the invention improve the technology of voice messaging by automatically appending visual tags or symbols illustrative of the contents of a voice message. Embodiments of the invention employ an unconventional arrangement of steps including: defining a plurality of visual icons; receiving from a first client device a voice message, metadata of the voice message, and tagging criteria; converting the voice message to text; generating a summary of the converted text; generating keywords based on the summary; categorizing the voice message into one or more categories based on the keywords and the metadata; selecting at least one of the plurality of visual icons based on the categories and the tagging criteria; tagging the voice message with the selected at least one of the plurality of visual icons; and sending the tagged voice message to a second client device. The steps themselves are unconventional, and the combination of the steps is also unconventional. For example, the steps of categorizing the voice message into one or more categories and selecting at least visual icons based on the categories creates new information that does not exist in the system, and this new information is then used in subsequent steps in an unconventional manner, namely to illustrate the contents of a voice message. Embodiments of the invention also utilize elements and/or techniques that are necessarily rooted in computer technology, including computing based language analysis. Embodiments improve the functioning of a computer combination, in this case a server and a client device, and more specifically includes aspects that are directed to a specific improvement of the operation of the mobile device when use in communication between users, and thus are directed to a specific implementation of a solution to a problem in multi-party voice message communications. Benefits of the embodiments include greater flexibility in dealing with a large number of voice messages in a group chatting environment, and greater time savings when reviewing a number of individual voice messages.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
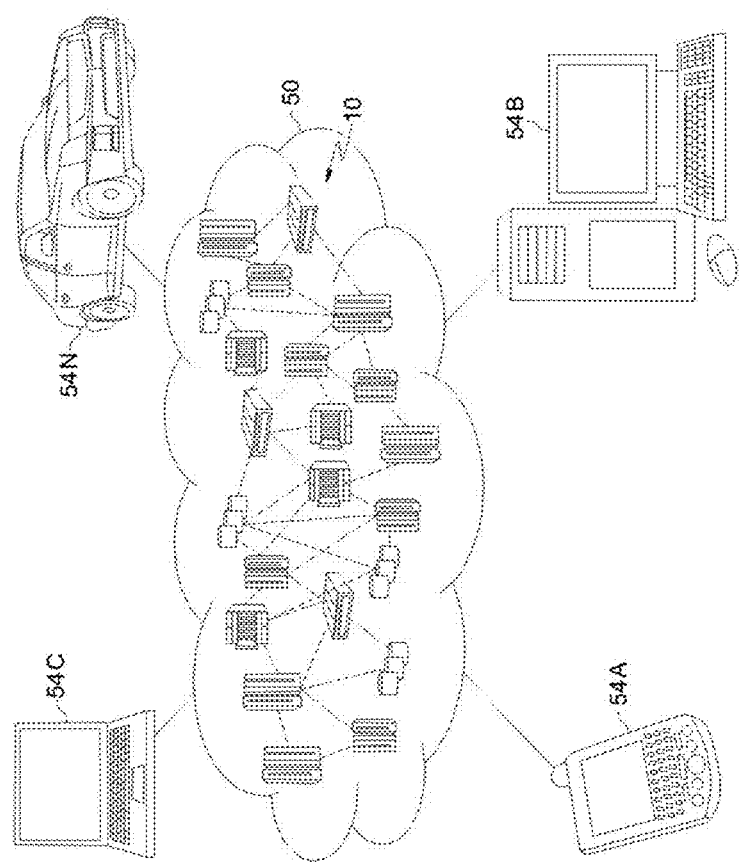
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
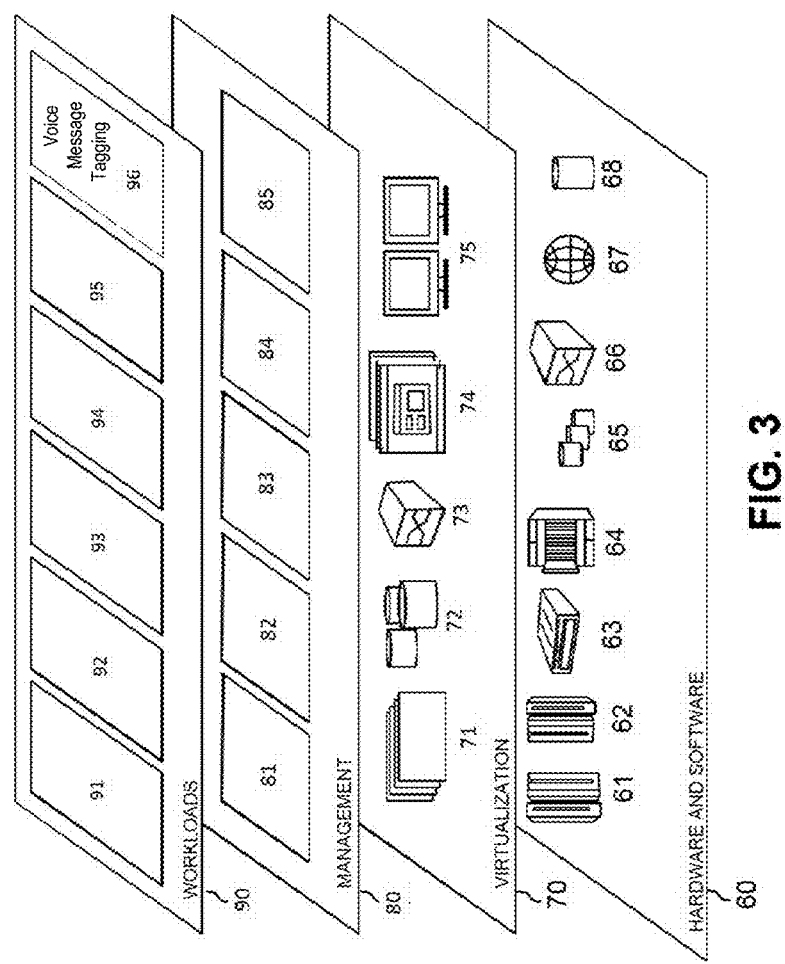
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and voice message tagging 96.

Implementations of the invention may include a computer system/server 12 of FIG. 1 in which one or more of the program modules 42 are configured to perform (or cause the computer system/server 12 to perform) one of more functions of the voice message tagging 96 of FIG. 3. For example, the one or more of the program modules 42 may be configured to: establish a user profile, a service profile, and voice tagging criteria; determine metadata for the voice message; embed the metadata in the voice message; apply the voice tagging criteria to the voice message; and send the voice message, the metadata and the voice tagging criteria. The one or more of the program modules 42 may also be configured to: receive the voice message, metadata and voice tagging criteria; convert the voice message to text; generate keywords based on the text and based on the metadata; categorize the voice message into one or more categories based on the generated keywords; create voice message tags based on the categorized voice message; tag the categorized voice message based on the voice tagging criteria; and send the tagged voice message.

Figure 4:
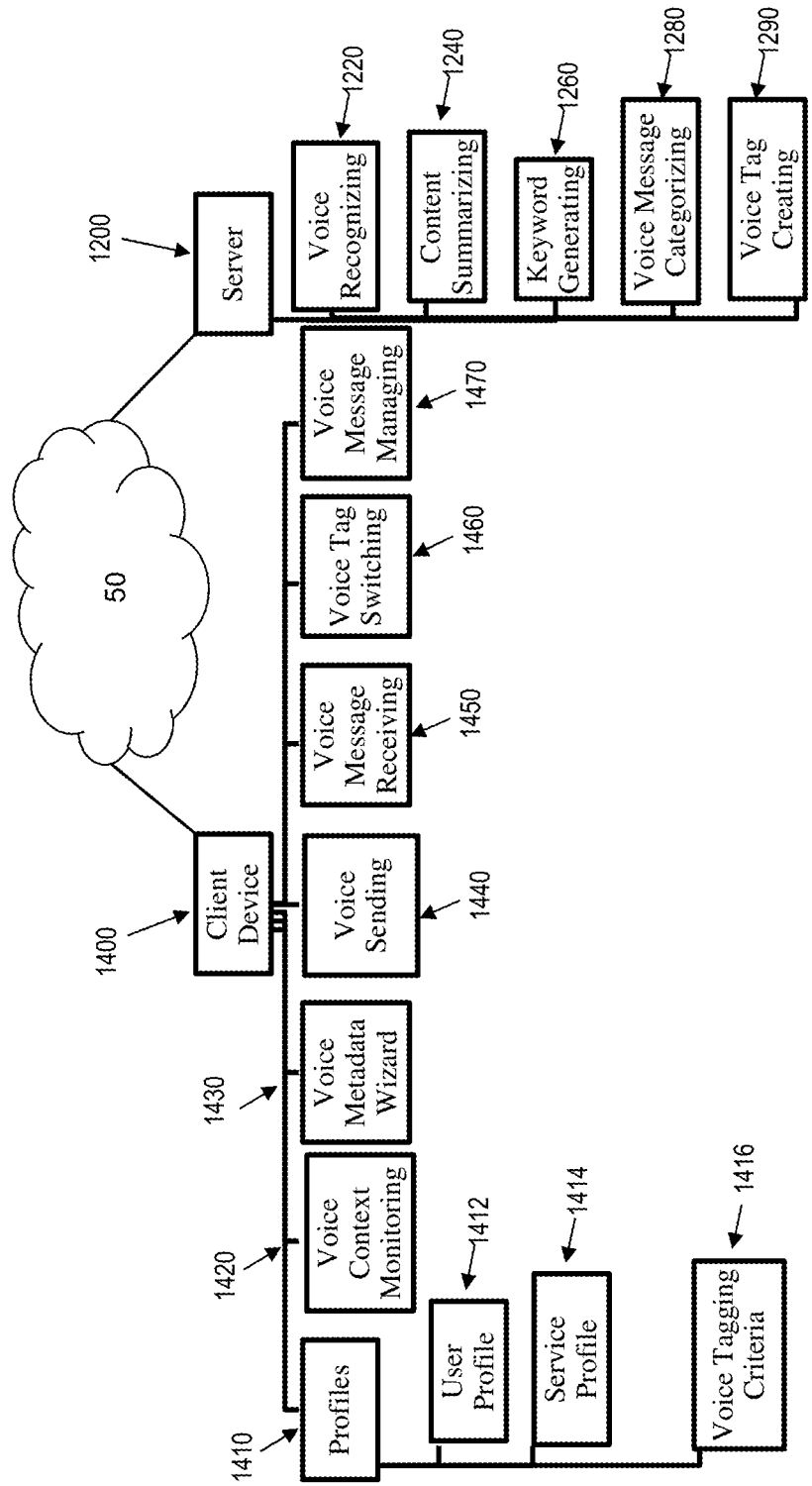
FIG. 4 shows a block diagram of an exemplary environment in accordance with aspects of the invention.

FIG. 4 shows a block diagram of an exemplary environment in accordance with aspects of the invention. In embodiments, the environment includes a server 1200 and a client device 1400 operatively coupled together via a network such as the cloud computing environment 50 illustrated in FIG. 2. The server 1200 is, for example, a centralized server in communication with one or more client devices of a plurality of client devices 1400. The server 1200 includes one or more elements of computer system/server 12 of FIG. 1. The client devices 1400 is, for example, fixed or mobile devices such as smart phones, portable tablets, and the like, and includes one or more elements of computer system/server 12 of FIG. 1.

In an embodiment, the client device 1400 includes one or more profiles 1410 such as, for example, a user profile 1412, a service profile 1414, and voice tagging criteria 1416 which associate a given visual icon with a given context of the voice message. In embodiments, context data that is illustrative of the context of the voice message includes time, location, type of event related to the voice message, an emotional context, a preference, and the like. In embodiments, each of the profiles 1410 such as the user profile 1412, the service profile 1414, and the voice tagging criteria 1416 includes data or data structures stored in a memory such as the storage system 34 of the computer system 12 illustrated in FIG. 1. In embodiments, the user profile 1412 includes an identity or other identifying characteristic of the user, preferred categories of voice messages, preferred keywords, preferred identity of the originator, and the like. In embodiments, the service profile 1414 is a collection of voice tagging rules, summarizing rules, keyword extracting rules, and the like. In embodiments, the voice tagging criteria 1416 includes a set of tagging thresholds or filters in order to, for example, categorize voice messages in terms of time and memory space, categorize keywords based on intrinsic plain-language meaning, categorize locations, events and emotions in order to define a set of criteria for voice message tagging, and define rules for enabling or disabling specific types of voices, or messages from, specific people or groups of people. In embodiments, the voice tagging criteria 1416 is changed or updated based on changes in the user profile 1412 and/or in the service profile 1414 to associate a given visual icon with a given context of the voice message.

In an embodiment, the client device 1400 includes a voice context monitoring module 1420 that determines context data indicative of the context of the voice message. In embodiments, the voice metadata wizard module 1430 embeds the context data determined by the voice context monitoring module 1420 in the voice message. In embodiments, the voice sending module 1440 sends the voice message, in which the context data that is determined by the voice context monitoring module 1420 is embedded by the metadata wizard module 1430, to a recipient device via server 1200. In embodiments, the voice tag switching module 1460 determines whether to affix a visual icon or tag such as, for example, an emoji, to the voice message, based on criteria included, for example, by the service profile 1414 and/or the user profile 1412. In embodiments, the emoji or tag is illustrative or indicative of the content of the voice message according to tagging rules, summarizing rules, keyword extracting rules, and the like, stored at the service profile 1414 and/or at the user profile 1412. In embodiments, the voice message managing module 1470 manages a graphic user interface (GUI) for configuring, filtering and displaying the tag with the voice message. In embodiments, the voice message managing module 1470 applies enabling/disabling rules for affixing a given icon or tag to a given voice message based on input from the voice tag switching module 1460, the rules being stored at the service profile 1414, the user profile 1412 or the voice tagging criteria 1416. In embodiments, the voice message receiving module 1450 receives an incoming voice message from, for example, the recipient or other party, where the incoming voice message includes tags or visual icons illustrative or indicative of the contents of the incoming voice message. For example, the visual icons are illustrative of context data such as a situation, a location, an action, an emotion, and/or a time. In embodiments, each of the voice context monitoring module 1420, the metadata wizard module 1430, the voice sending module 1440, the voice message receiving module 1450, the voice tag switching module 1460 and the voice message managing module 1470 includes one or more program modules such as program modules 42 described with respect to FIG. 1.

In an embodiment, the server 1200 includes a voice recognizing module 1220, a content summarizing module 1240, a keyword generating module 1260, a voice message categorizing module 1280 and a voice tag creating module 1290. In embodiments, the voice recognizing module 1220 converts a voice message sent by the voice sending module 1440 into text. In embodiments, the content summarizing module 1240 summarizes the text of the converted received voice message based on the contents of the voice message transcribed into text. For example, the content summarizing module 1240 summarizes the text of the converted received voice message by using, for example, natural language processing, or by creating a representative summary by finding the most informative terms of the transcribed voice message, from a list of informative terms, in order to create the summary. In embodiments, the keyword generating module 1260 generates one or more keyword(s) based on the summary of the converted voice message generated by the content summarizing module 1240. Based on the keyword(s) generated by the keyword generating module 1260, the voice message categorizing module 1280 classifies the voice message into one of a plurality of categories. Based at least on the keyword(s) and the category(ies) of the voice message, the voice tag creating module 1290 selects a visual tag such as, for example, an emoji, that is representative of the generated keyword(s). For example, a "$" sign is selected to represent a money transfer or request. In embodiments, each of the voice recognizing module 1220, the content summarizing module 1240, the keyword generating module 1260, the voice message categorizing module 1280 and the voice tag creating module 1290 includes one or more program modules such as program modules 42 described with respect to FIG. 1.

Figure 5:
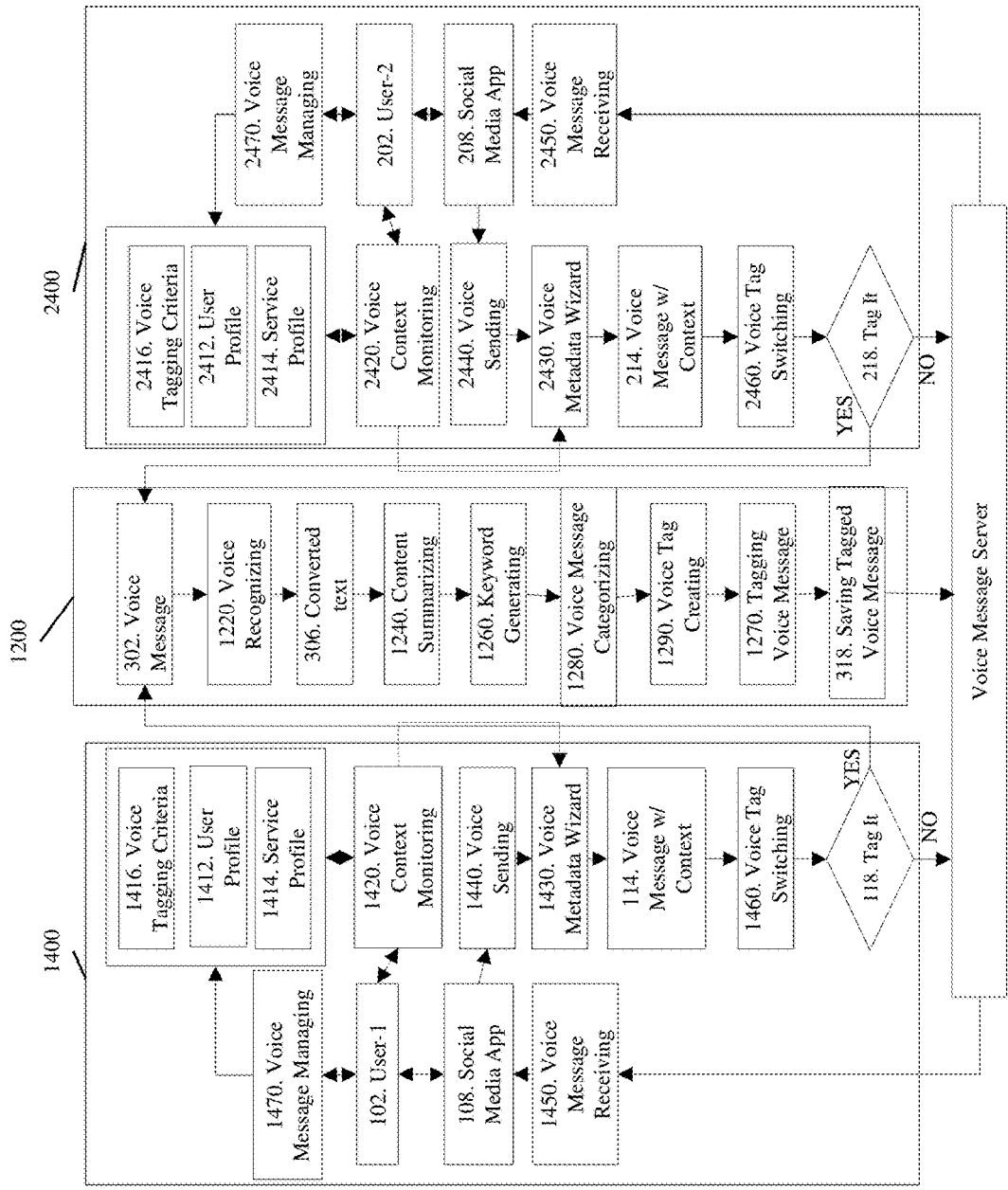
FIG. 5 shows a functional block diagram in accordance with aspects of the invention.

FIG. 5 shows a functional block diagram in accordance with aspects of the present invention. Steps of the diagram are carried out in the environment of FIG. 4 and are described with reference to elements depicted in FIG. 4. At the client device 1400, in embodiments, the first user 102 has a user profile 1412, which includes an identity, other identifying characteristic of the user or an indication of preferred voice messages classified by type or originator, and the like. In embodiments, the first user 102 transmits a voice message 302 to a recipient device 2400, which is similar in structure to the client device 1400. In embodiments, information about the first user 102, which is part of the user profile 1412, can also be obtained from, for example, one or more social media applications 108, or a voicemail received at a voice message receiving module such as the voice message receiving module 1450 illustrated at FIG. 4.

In embodiments, the voice message managing module 1470 manages a graphic user interface (GUI) for configuring, filtering and displaying a visual icon or tag with the voice message. In embodiments, the visual icon is displayed based on voice tagging criteria 1416, the user profile 1412, and a service profile 1414 and which include summarizing rules, keyword extracting rules, rules enabling or disabling specific types of voices or of messages from specific people or groups of people, and the like.

In embodiments, the voice context monitoring module 1420 determines context data indicative of the context of the voice message, the context data including, for example, time, location, events, actions, emotions, and the like, and provides input to the voice metadata wizard module 1430 also illustrated at FIG. 4. In embodiments, the voice metadata wizard module 1430 generates the metadata by combining the voice message provided by the voice sending module 1440 and the context data determined by the voice context monitoring module 1420, and embeds the metadata in the voice message at step 114. In embodiments, the voice tag switching module 1460 determines whether to embed or not to embed a visual icon or tag such as, for example, an emoji, in the voice message, based on criteria included, for example, in the service profile 1414, the user profile 1412 and/or the voice tagging criteria 1416. In embodiments, if the voice tag switching module 1460 determines at step 118 that the voice message should be tagged, then the voice sending module 1440, also illustrated at FIG. 4, sends the voice message with one or more visual icons or symbols to the recipient device 2400 via the server 1200 also illustrated in FIG. 4. In embodiments, the one or more visual icons or symbols are to be displayed next to the corresponding voice message on the recipient's device screen, and provide an illustration of the contents of the voice message to the recipient. In embodiments, if the voice tag switching module 1460 determines at step 118 that the voice message should not be tagged, then the voice sending module 1440 sends the voice message to the recipient device 2400 via the server 1200 without adding a visual icon or tag to the voice message.

In embodiments, at the server 1200, the voice recognizing module 1220, also illustrated in FIG. 4, receives the voice message 302 and converts the voice message sent by the voice sending module 1440 into converted text 306, and the content summarizing module 1240, also illustrated in FIG. 4, summarizes the converted text 306. In embodiments, the keyword generating module 1260, also illustrated in FIG. 4, generates one or more keyword(s) based on the summary generated by the content summarizer 1240. In embodiments, the voice message categorizing module 1280, also illustrated in FIG. 4, classifies the voice message into one or more of a plurality of categories based on the keyword(s) generated by the keyword generating module 1260 and the metadata. For example, the voice message categories are "emergency," "coffee" for a social meeting, or "business meeting."

In embodiments, the voice tag creating module 1290, also illustrated in FIG. 4, creates or selects one or more visual icons or symbolic tags such as, for example, an emoji, that is representative of the contents of the voice message and that is created or selected based on the generated keywords and the category of the voice message. The voice tag creating module 1290 also defines a plurality of tagging criteria that include rules on associating a given visual icon with a given context of the voice message. In embodiments, the voice tag creating module 1290 tags the voice message with one or more of the visual icons or tags. In embodiments, at 318, the server saves the tagged voice message in memory.

In embodiments of the invention, at another client device 2400, a second user 202 has a user profile 2412 and receives the voice message from, for example, the first user 102 of the client device 1400 via the server 1200. In embodiments, information about the second user 202, which is part of the user profile 2412, can also be obtained from, for example, one or more social media applications 208, or a voice message received at a voice message receiving module 2450. In embodiments and similarly to the first user 102, the voice message managing module 2470, similar to the voice message managing module 1470, manages a graphic user interface (GUI) for configuring, filtering and displaying a visual icon or tag with the voice message based on voice tagging criteria 2416, a user profile 2412 similar, and a service profile 2414.

In embodiments, the voice context monitoring module 2420 determines context data indicative of the context of the voice message. In embodiments, the voice metadata wizard module 2430 generates the metadata by combining the voice message provided by the voice sending module 2440 and the context data determined by the voice context monitoring module 2420, and embeds the metadata in the voice message at step 214. In embodiments, the voice tag switching module 2460 determines whether to embed a visual icon or tag in the voice message, based on criteria included in the service profile 2414 and/or the user profile 2412. In embodiments, if the voice tag switching module 2460 determines at step 218 that the voice message should be tagged, then the voice sending module 2440 sends the voice message to the voice message managing module 2470. In embodiments, if the voice tag switching module 2460 determines at step 218 that the voice message should not be tagged, then the voice sending module 2440 sends the voice message to the first user 102, without adding a visual icon or tag to the voice message. Each of the user profile 2412, the service profile 2414, and the voice tagging criteria 2416 includes data or data structures stored in a memory such as the storage system 34 of the computer system 12 illustrated in FIG. 1. Also, each of the voice context monitoring module 2420, the metadata wizard module 2430, the voice sending module 2440, the voice message receiving module 2450, the voice tag switching module 2460 and the voice message managing module 2470 includes one or more program modules such as program modules 42 described with respect to FIG. 1.

Figure 6A:
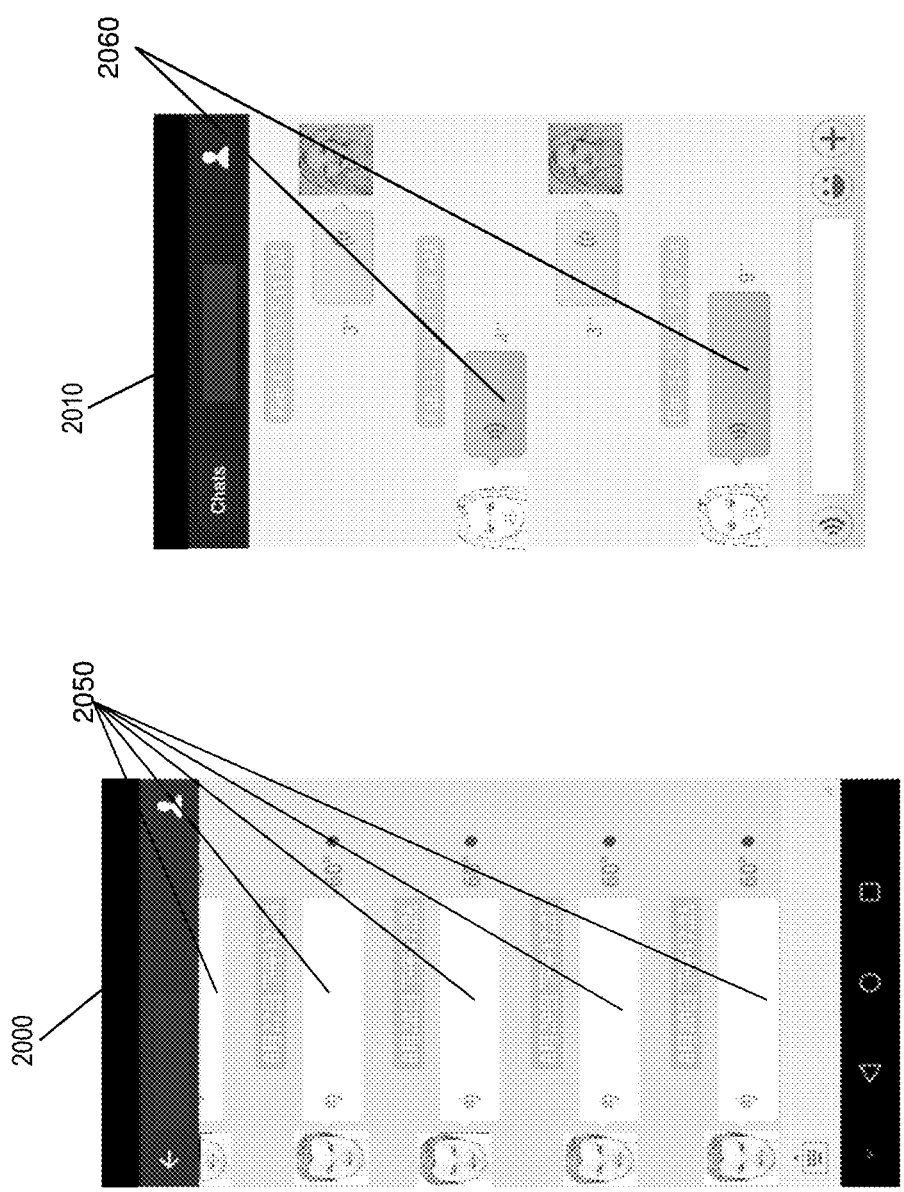
FIG. 6A depicts a client device without voice message tagging.

FIG. 6A depicts a client device without voice message tagging. FIG. 6A depicts client device screens 2000 and 2010 for two different users during a voice message chat between the two users. In FIG. 6A, the users of the client devices cannot evaluate the contents of the various voice messages 2050 or 2060 received during the chat merely by looking at their respective screens. For example, one or both of the users have been absent for a period of time, and have received a number of voice messages during that absence. In FIG. 6A, the users have a single option for determining the content of the voice messages, that option being to spend the time listening to all the missed voice messages.

Figure 6B:
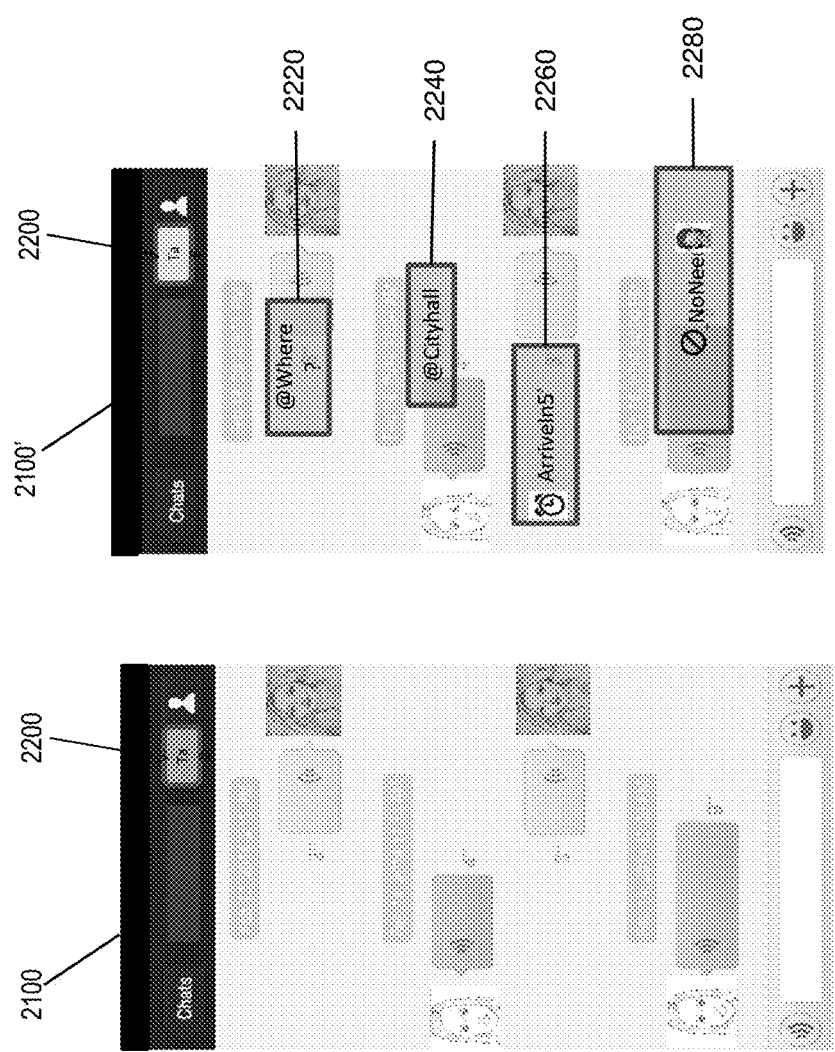
FIG. 6B depicts a client device with voice message tagging in accordance with aspects of the invention.

FIG. 6B depicts a client device with voice message tagging according to an embodiment of the present invention. In particular, FIG. 6B depicts a client device screen 2100 during a voice message chat between at least two people, where the user determines whether to allow visual tagging of the voice messages by selecting the tagging option 2200. In FIG. 6B, the user has been absent for a period of time, and received a number of voice messages during that absence. However, unlike in FIG. 6A, the user in FIG. 6B has the ability to evaluate the contents of at least some of the voice messages without having to spend the time listening to all the voice messages if the user has selected the tagging option 2200. On the left-hand side client device screen 2100 in FIG. 6B, the user does not select the tagging option, and on the right-hand side client device screen 2100', the user selects the tagging option 2200. As a result, according to aspects of the invention, in response to the user provide input at the tagging option 2200, the system automatically appends tags 2220, 2240, 2260 and 2280 associated with the various voice messages currently shown on the client device screen 2100', such that the user has the ability to determine or evaluate the contents of the voice messages by merely viewing or reading the various tags 2220, 2240, 2260 and 2280 next to each voice message on the client device screen 2100'.

Still referring to the example shown in FIG. 6B, in embodiments, one of the user and a correspondent exchange voice messages, where the user asks the question "where are you"? Based on this voice message, the system automatically appends tag 2220 to illustrate the question. In the response, the correspondent replies "I am in city hall." Based on this voice message, the system automatically appends tag 2240 to illustrate the statement. The user then says "I will be there in 5 minutes," and the system automatically appends tag 2260. The correspondent finally says "No need, I am leaving now," and the system automatically appends tag 2280. It should be note that the above tags are for illustration purposes, and these tags as well as other tags can be used to illustrate various contexts of voice messages.

Figure 7A:
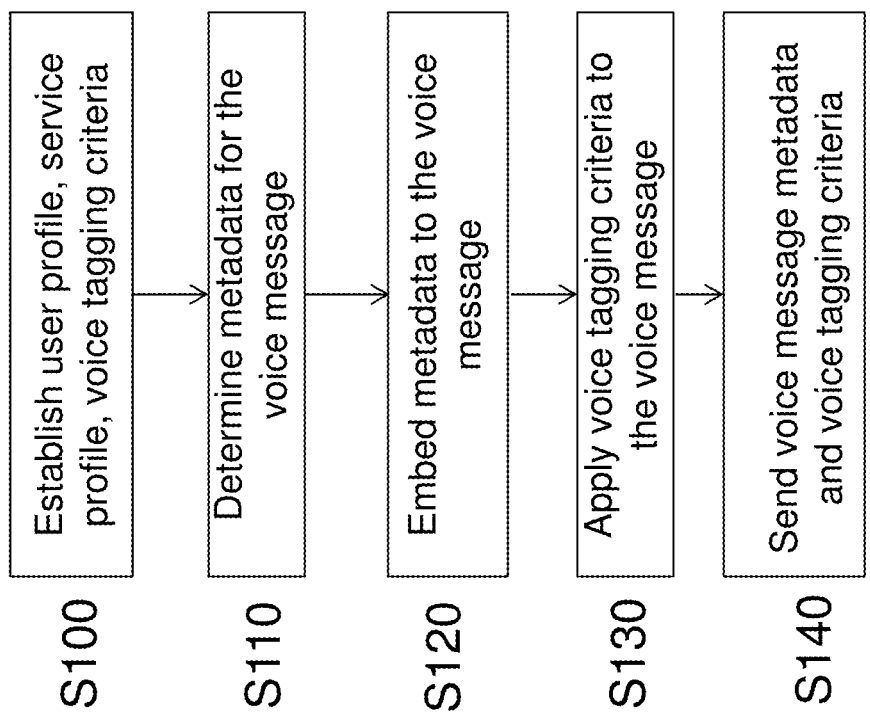
FIGS. 7A-7B depict flowcharts of methods of tagging voice messages in accordance with aspects of the invention.
Figure 7B:
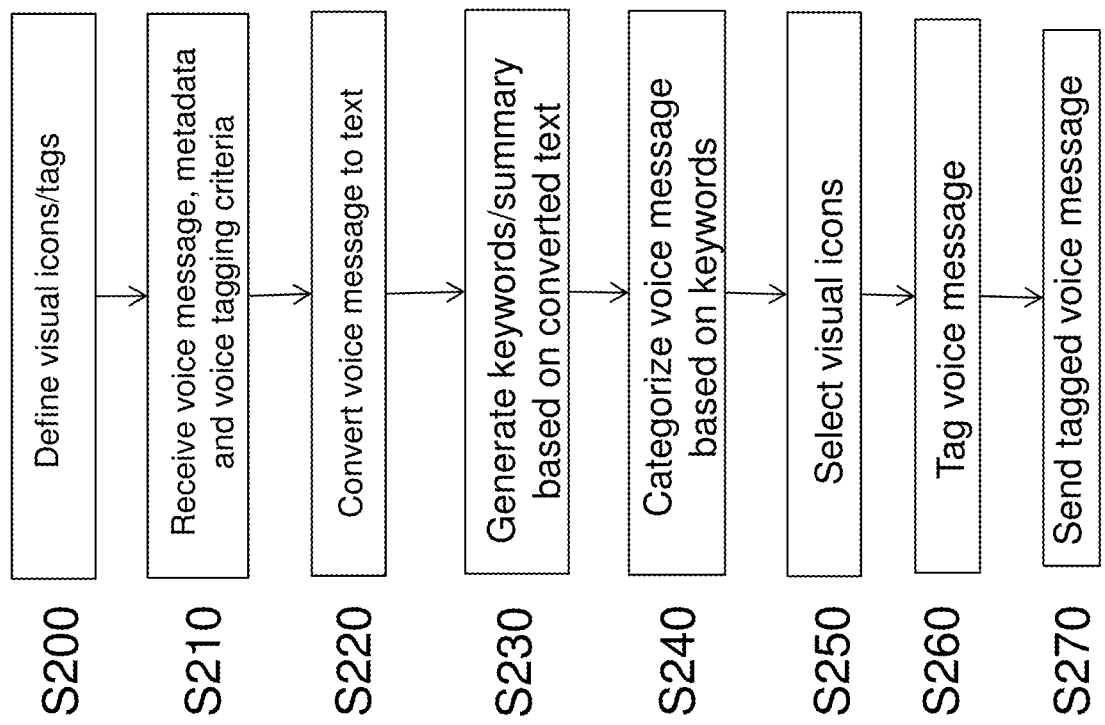

FIGS. 7A-7B depict flowcharts of methods of tagging voice messages, according to an embodiment of the present invention. Steps of the method are carried out in the environment of FIG. 4 and are described with reference to elements depicted in FIG. 4. In FIG. 7A, in embodiments, at step S100, the system establishes a user profile, a service profile, and voice tagging criteria at a client device. In embodiments, at step S110, the system determines metadata for the voice message, the metadata including context data for the voice message at the client device. In embodiments, at step S120, the system embeds the metadata in the voice message at the client device. In embodiments, at step S130, the system applies the voice tagging criteria to the voice message. In embodiments, at step S140, the system sends the voice message, the metadata and the voice tagging criteria.

In FIG. 7B, in embodiments, at step S200, a plurality of visual icons are defined at a server. Steps of the method are carried out in the environment of FIG. 4 and are described with reference to elements depicted in FIG. 4. For example, the visual icons or tags are indicative of contents of a voice message. In embodiments, at step S210, the system receives the voice message, metadata and voice tagging criteria at the server. In embodiments, at step S220, the system converts the voice message to text. In embodiments, at step S230, the system generates a summary of the converted text, and keywords based on the summary. In embodiments, at step S240, the system categorizes the voice message into one or more categories based on the generated keywords. In embodiments, at step S250, the system selects one or more visual icons or tags from the defined plurality of visual icons based on the categorized voice message and the metadata at the server, the visual icons or tags being indicative of the contents of the voice message. In embodiments, at step S260, the system tags the categorized voice message with the selected visual icons by the voice message on a screen of the client device based on the tagging criteria. In embodiments, at step S270, the system sends the tagged voice message.

It should be understood that, to the extent implementations of the invention collect, store, or employ personal information provided by, or obtained from, individuals (for example, social media applications 108), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, a service provider could offer to perform the processes described herein. In this case, the service provider can create, maintain, deploy, support, etc., the computer infrastructure that performs the process steps of embodiments of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Additional embodiments of the invention provide a computer-implemented method, via a network. In this case, a computer infrastructure, such as computer system/server 12 (FIG. 1), can be provided and one or more systems for performing the processes of embodiments of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of embodiments of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
defining, by a server, a plurality of visual icons;
receiving, by the server and from a first client device, a voice message, metadata of the voice message, and tagging criteria, wherein the tagging criteria comprise rules for associating certain keywords with ones of the visual icons;
converting, by the server, the voice message to text;
generating, by the server, a summary of the converted text;
generating, by the server, keywords based on the summary;
categorizing, by the server, the voice message into one or more categories based on the keywords and the metadata;
selecting, by the server, at least one of the plurality of visual icons based on the categories and the tagging criteria;
tagging, by the server, the voice message with the selected at least one of the plurality of visual icons, wherein the selected at least one of the plurality of visual icons comprise an emoji that is representative of the contents of the voice message; and
sending, by the server and to a second client device, the tagged voice message.

2. The computer-implemented method of claim 1, wherein the metadata of the voice message comprises context data for the voice message.

3. The computer-implemented method of claim 2, wherein the context data comprises at least one selected from the group consisting of a location, an action, an emotion and a time.

4. The computer-implemented method of claim 1, wherein the tagging criteria further comprises enabling or disabling rules based on a category of the voice message and originator identity.

5. The computer-implemented method of claim 1, wherein the selected at least one of the plurality of visual icons are illustrative of the one or more categories based on the tagging criteria.

6. The computer-implemented method of claim 1, wherein the one or more categories comprise at least one selected from the group consisting of an emergency, a social meeting, and a business meeting.

7. The computer-implemented method of claim 1, wherein the server includes software provided as a service in a cloud computing environment.

8. The computer-implemented method of claim 1, wherein the tagging criteria include data structures stored on the first client device and are updated based on changes to a user profile also stored on the first client device.

9. The computer-implemented method of claim 8, wherein the voice message is configured to be displayed on the second client device in such a manner that the user of the second client device can provide input via a tagging option button to toggle between displaying the voice message without tags and displaying the tagged voice message.

10. A computer program product comprising a computer readable storage medium having program instructions embodied therewith, the program instructions being executable by a computer device to cause the computer device to:

determine, by the computer device, metadata for a voice message at the computer device;

embed, by the computer device, the metadata in the voice message;

apply, by the computer device, voice tagging criteria to the voice message, wherein the voice tagging criteria comprise rules for associating certain keywords with ones of visual icons; and send, by the computer device, the voice message, the metadata, and the voice tagging criteria to a server that tags the voice message with a selected at least one of the visual icons, wherein the selected at least one of the visual icons comprise an emoji that is representative of the contents of the voice message, wherein a user profile, a service profile, and the voice tagging criteria are stored as data structures in a memory of the computer device; and the service profile comprises a tagging rule, a summarizing rule, and a keyword extracting rule.

11. The computer program product of claim 10, wherein the user profile comprises at least one selected from the group consisting of an identity of the user, a preferred category of voice messages, a preferred keyword, and a preferred originator of the voice message.

12. The computer program product of claim 10, wherein the voice tagging criteria comprise enabling or disabling rules based on a category of the voice message and originator identity.

13. The computer program product of claim 10, wherein the metadata for the voice message comprises context data for the voice message.

14. The computer program product of claim 13, wherein the context data comprises at least one selected from the group consisting of a location, an action, an emotion and a time.

15. A system comprising:

a processor, a computer readable memory, and a computer readable storage medium;

program instructions to define a plurality of visual icons;

program instructions to receive, from a first client device, a voice message, metadata of the voice message, and tagging criteria;

program instructions to convert the voice message to text;

program instructions to generate a summary of the converted text;

program instructions to generate keywords based on the summary;

program instructions to categorize the voice message into one or more categories based on the keywords and the metadata;

program instructions to select at least one of the plurality of visual icons based on the categories and the tagging criteria;

program instructions to tag the voice message with the selected at least one of the plurality of visual icons; and program instructions to send the tagged voice message to a second client device, wherein the tagging criteria comprise rules for associating at least one of the keywords with at least one of the plurality of visual icons; and wherein the program instructions are stored on the computer readable storage medium for execution by the processor via the computer readable memory.

16. The system of claim 15, wherein the plurality of visual icons are illustrative of at least one selected from the group of a situation, a location, an action, an emotion, and a time context.

17. The system of claim 15, wherein the metadata of the voice message comprises context data.

18. The system of claim 17, wherein the context data comprises at least one selected from the group consisting of a location, an action, an emotion and a time.

19. The system of claim 15, wherein the selected at least one of the plurality of visual icons are indicative of the one or more categories based on the tagging criteria.

20. The system of claim 15, wherein the one or more categories comprise at least one selected from the group consisting of an emergency, a social meeting, and a business meeting.

* * * * *